(No Model.)

10 Sheets—Sheet 1.

O. R. CHAPLIN.
BOTTLING WIRE MACHINE.

No. 314,428. Patented Mar. 24, 1885.

Witnesses.
Matthew Clark
Robert Wallace

Inventor.
Orril R. Chaplin
by W. A. Macleod
atty (No Model.)  10 Sheets—Sheet 3.
O. R. CHAPLIN.
BOTTLING WIRE MACHINE.

No. 314,428.  Patented Mar. 24, 1885.

Witnesses
Matthew Clark
Robert Wallace

Inventor
Orril R. Chaplin
by Wm A. MacLeod
his atty (No Model.)
O. R. CHAPLIN.
BOTTLING WIRE MACHINE.
No. 314,428.   Patented Mar. 24, 1885.
10 Sheets—Sheet 4.
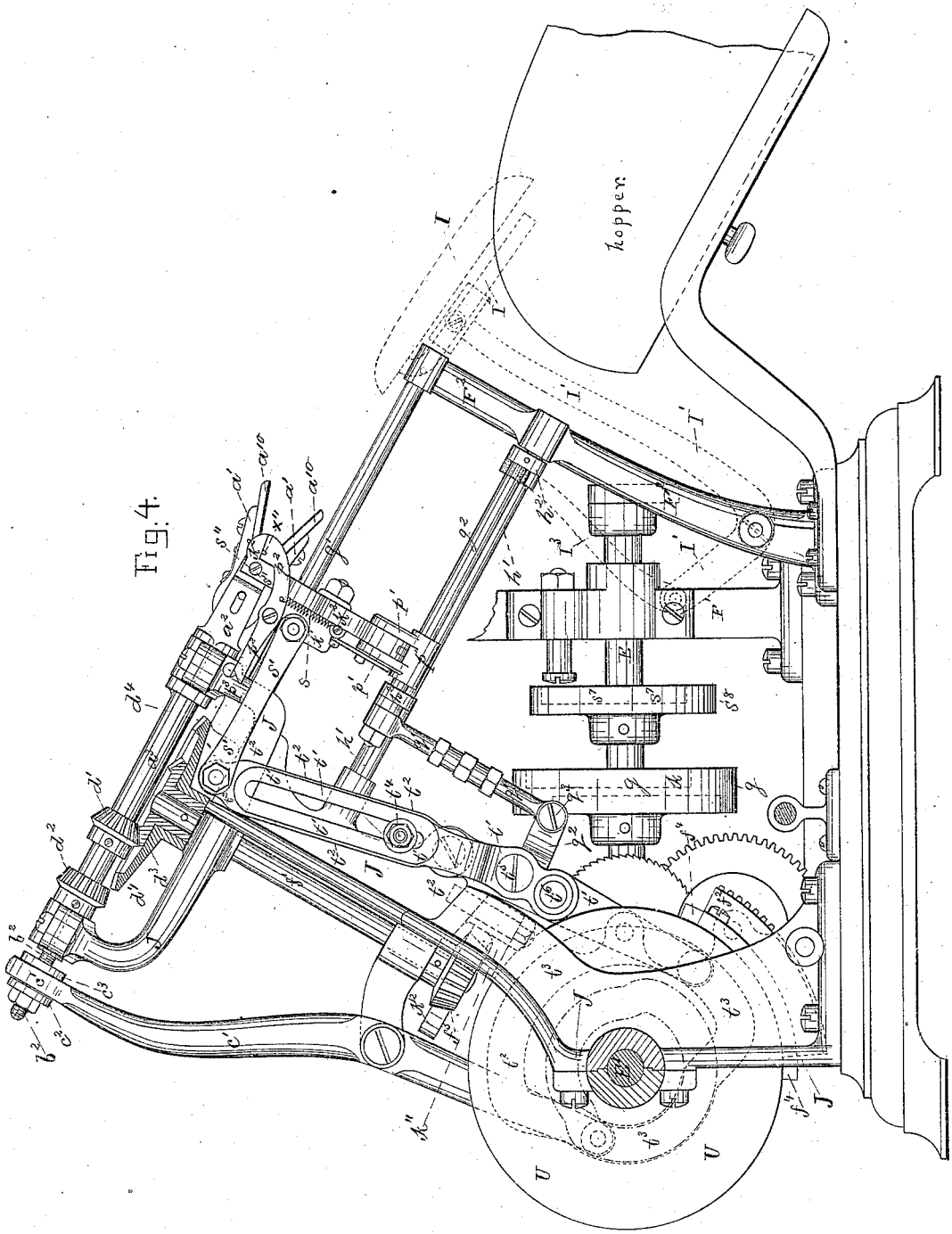
Witnesses.
Matthew Clark
Robert Wallace
Inventor.
Orril R. Chaplin,
by Wm. A. Macleod.
his Atty.

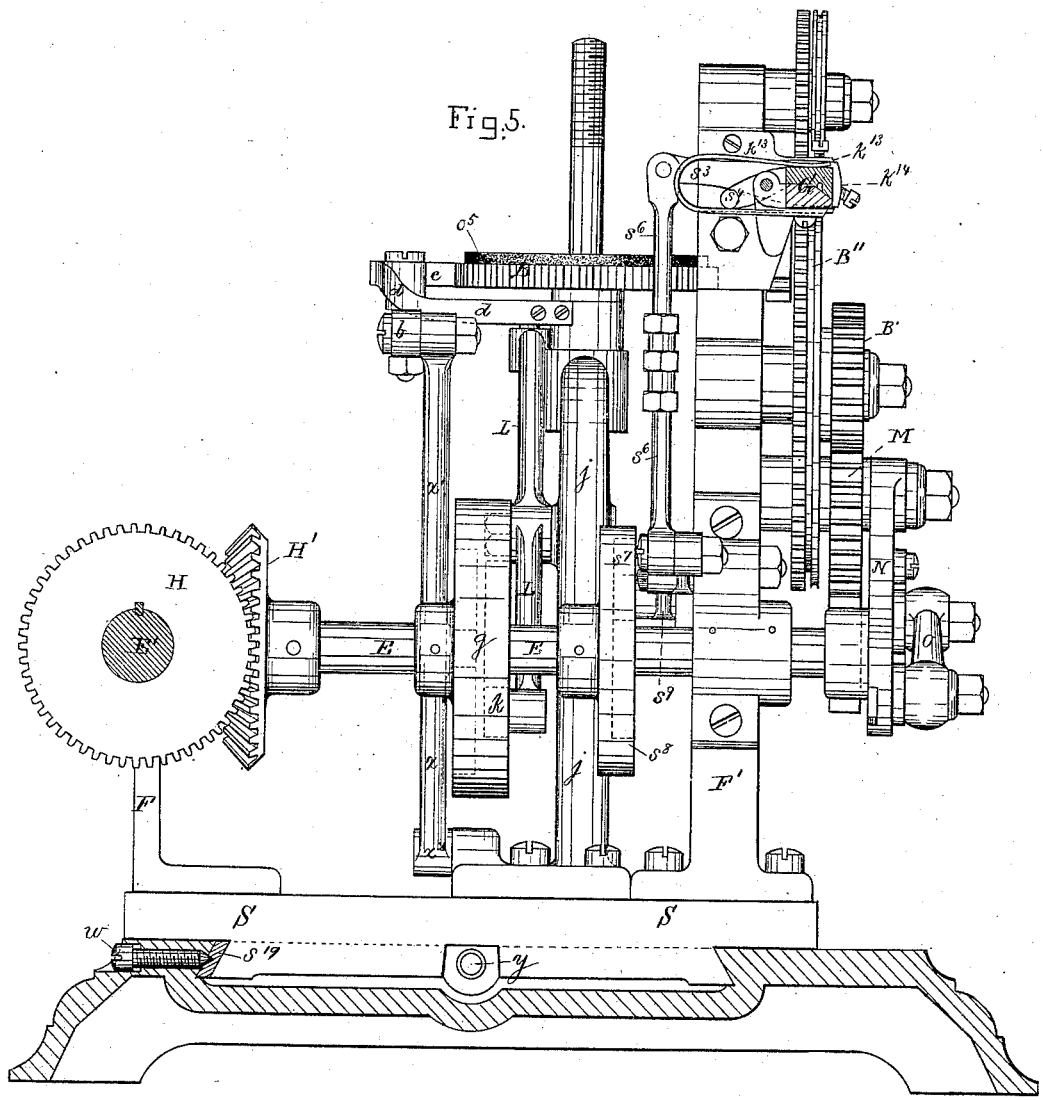

(No Model.)
O. R. CHAPLIN.
BOTTLING WIRE MACHINE.
No. 314,428. Patented Mar. 24, 1885.
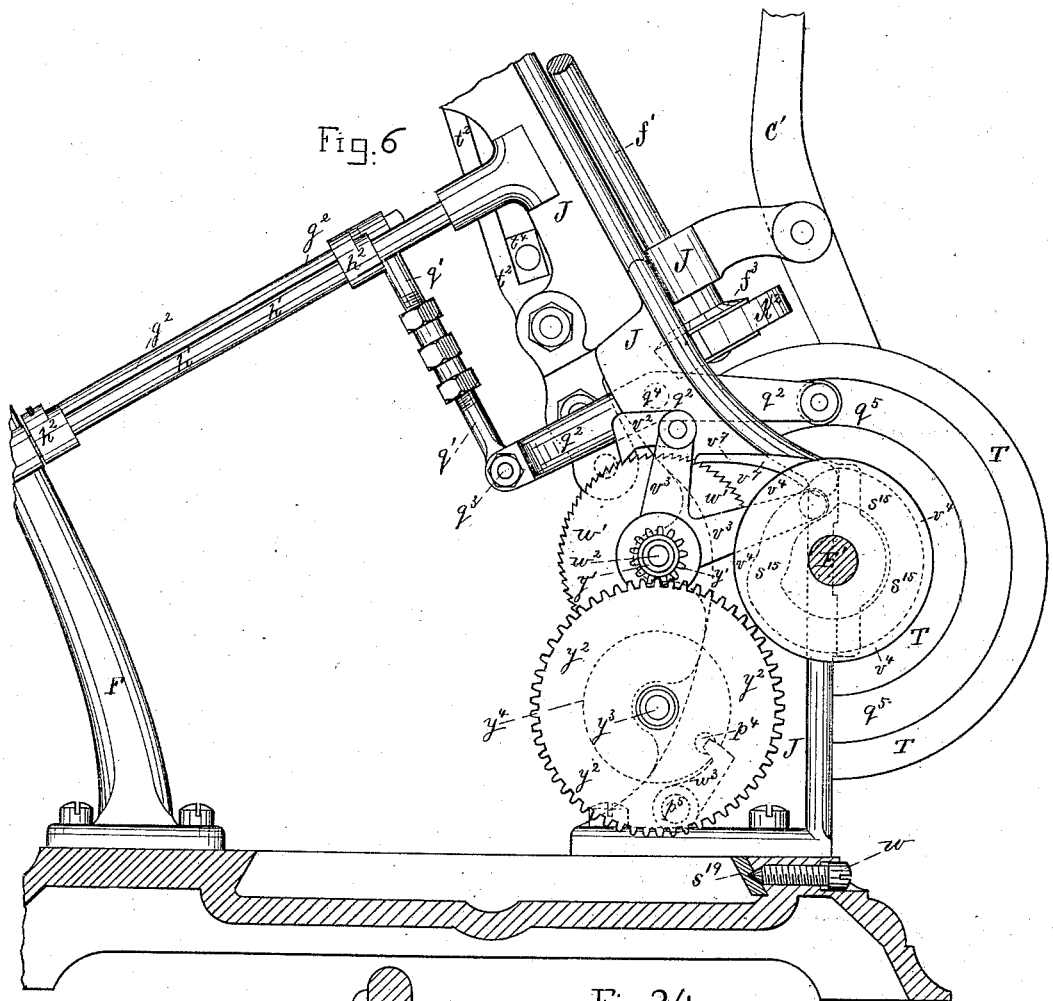
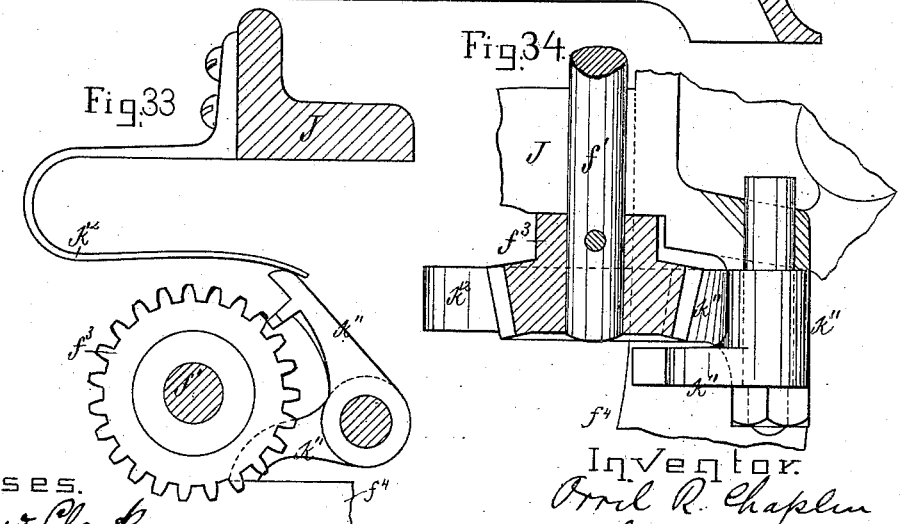

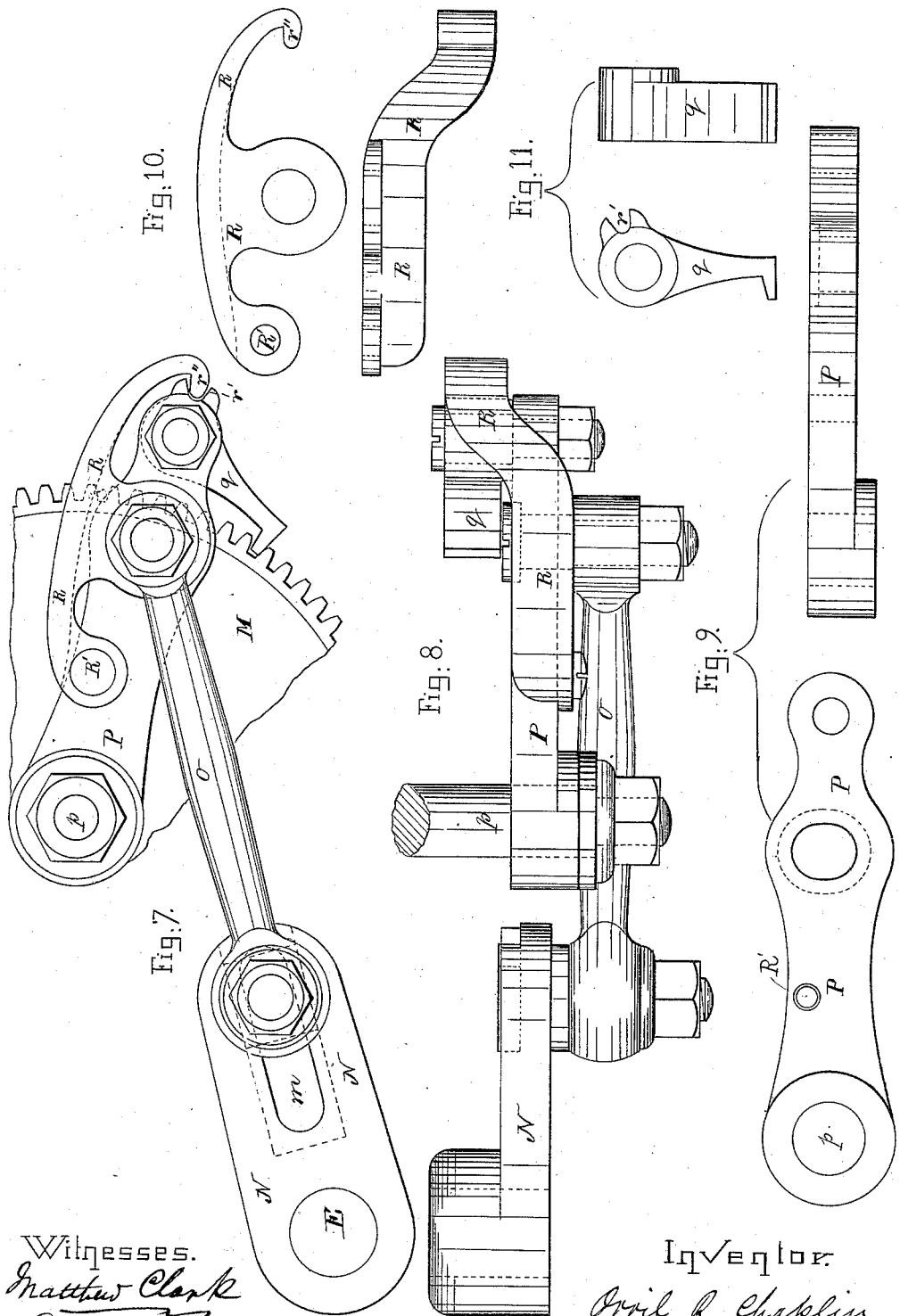

(No Model.) 10 Sheets—Sheet 8.
O. R. CHAPLIN.
BOTTLING WIRE MACHINE.
No. 314,428. Patented Mar. 24, 1885.
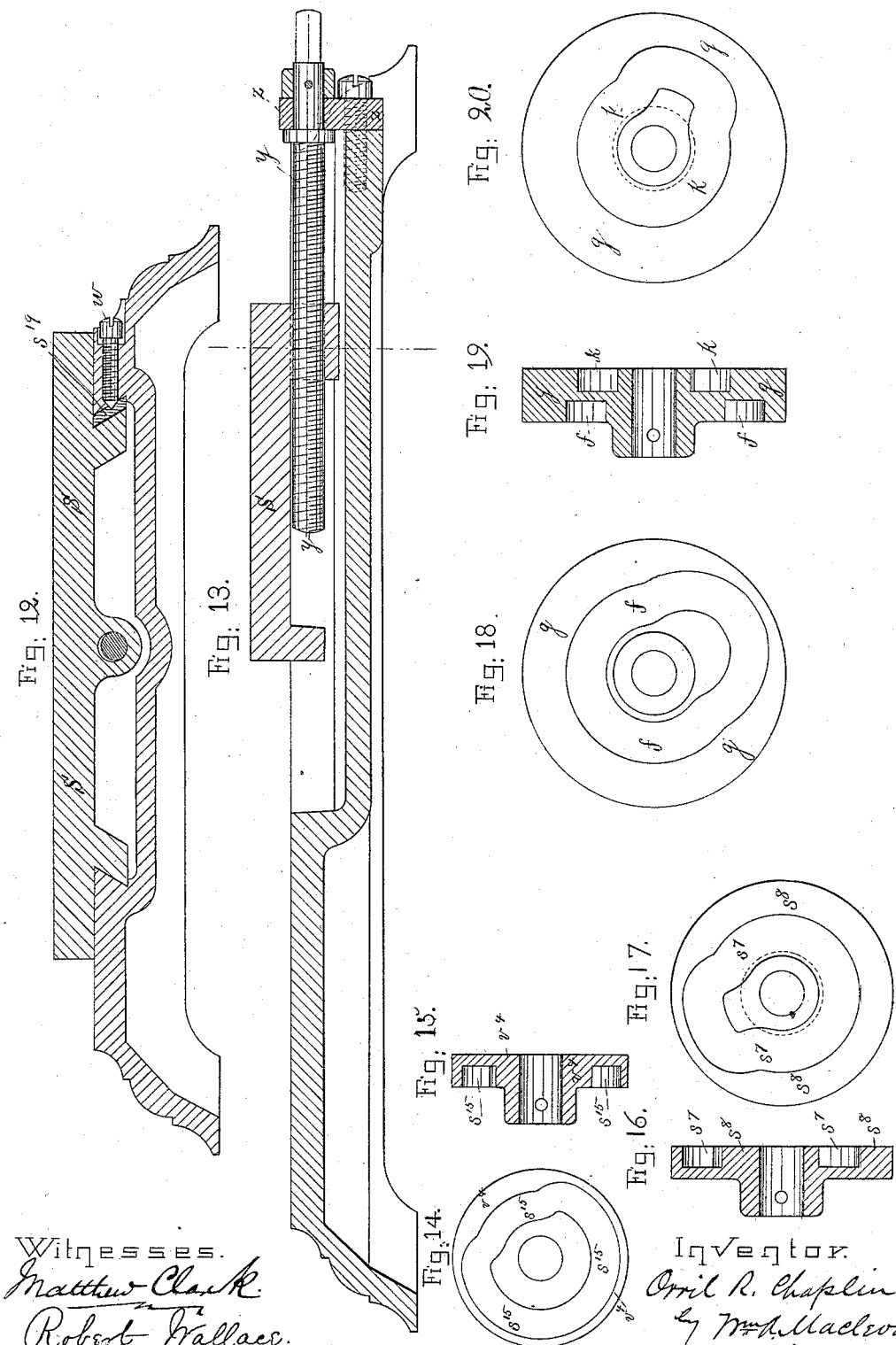
Witnesses.
Matthew Clark.
Robert Wallace.
Inventor.
Orril R. Chaplin,
by Wm A. Macleod.
his Atty (No Model.)
O. R. CHAPLIN.
BOTTLING WIRE MACHINE.
No. 314,428.　　　　　　　　Patented Mar. 24, 1885.
10 Sheets—Sheet 9.
Fig. 21.　　　Fig. 22.　　　Fig. 23.
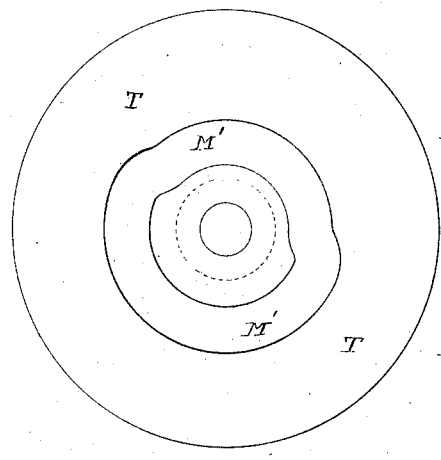
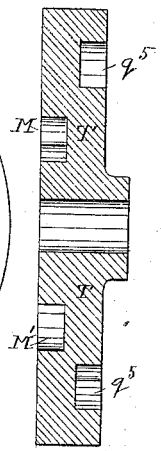
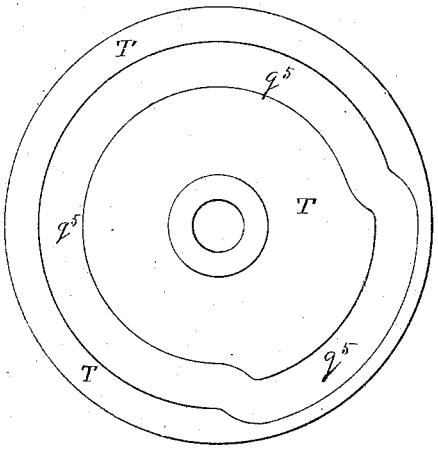
Fig. 24.　　　Fig. 25.
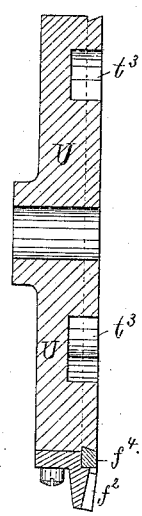
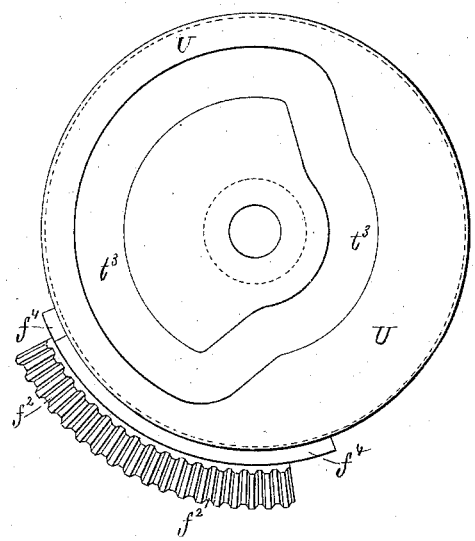
Witnesses.
Matthew Clark
Robert Wallace.
Inventor.
Orril R. Chaplin
by Wm A. Macleod
his Atty

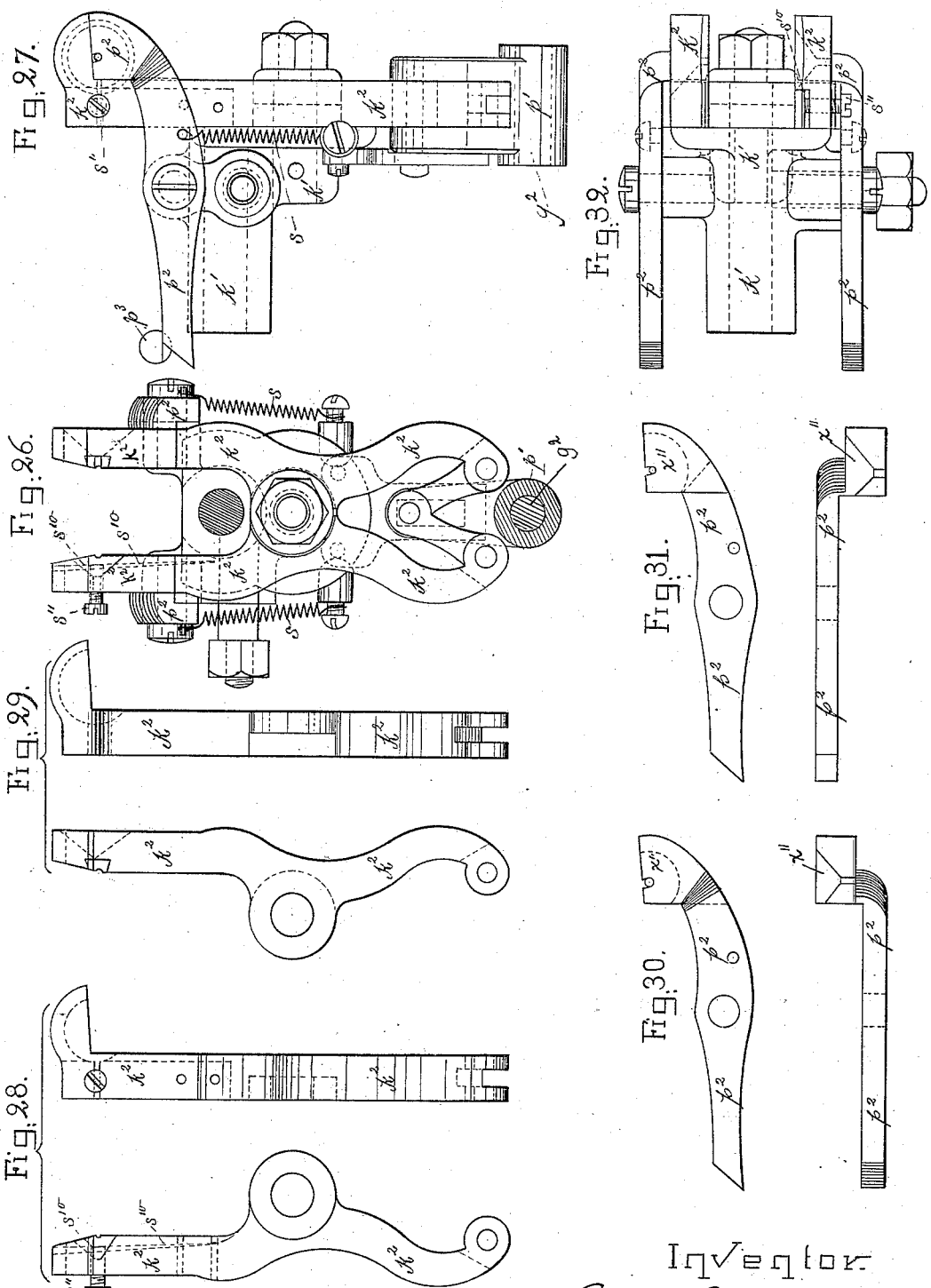

UNITED STATES PATENT OFFICE.

ORRIL R. CHAPLIN, OF BOSTON, MASSACHUSETTS, ASSIGNOR, BY DIRECT AND MESNE ASSIGNMENTS, TO THE CHAPLIN BOTTLING WIRE COMPANY OF NEW HAMPSHIRE.

BOTTLING-WIRE MACHINE.

SPECIFICATION forming part of Letters Patent No. 314,428, dated March 24, 1885.

Application filed November 4, 1882. (No model.)

*To all whom it may concern:*

Be it known that I, ORRIL R. CHAPLIN, of Boston, county of Suffolk, State of Massachusetts, have invented a new and useful Improvement in Machinery for Manufacturing Bottling-Wires, of which the following is a full, clear, concise, and exact description, reference being had to the drawings accompanying and forming a part hereof, in which—

Figure 1:
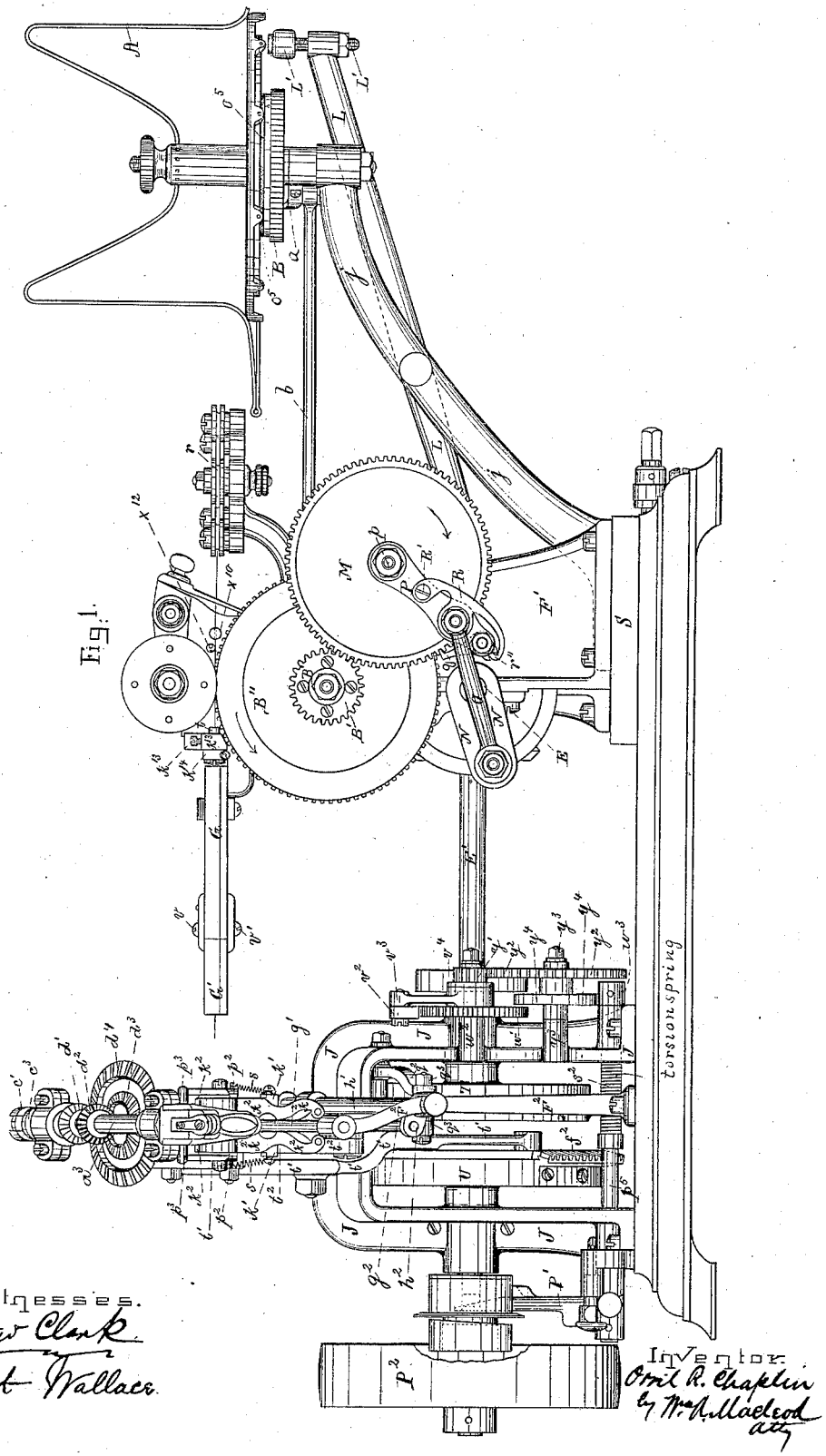
Figure 2:
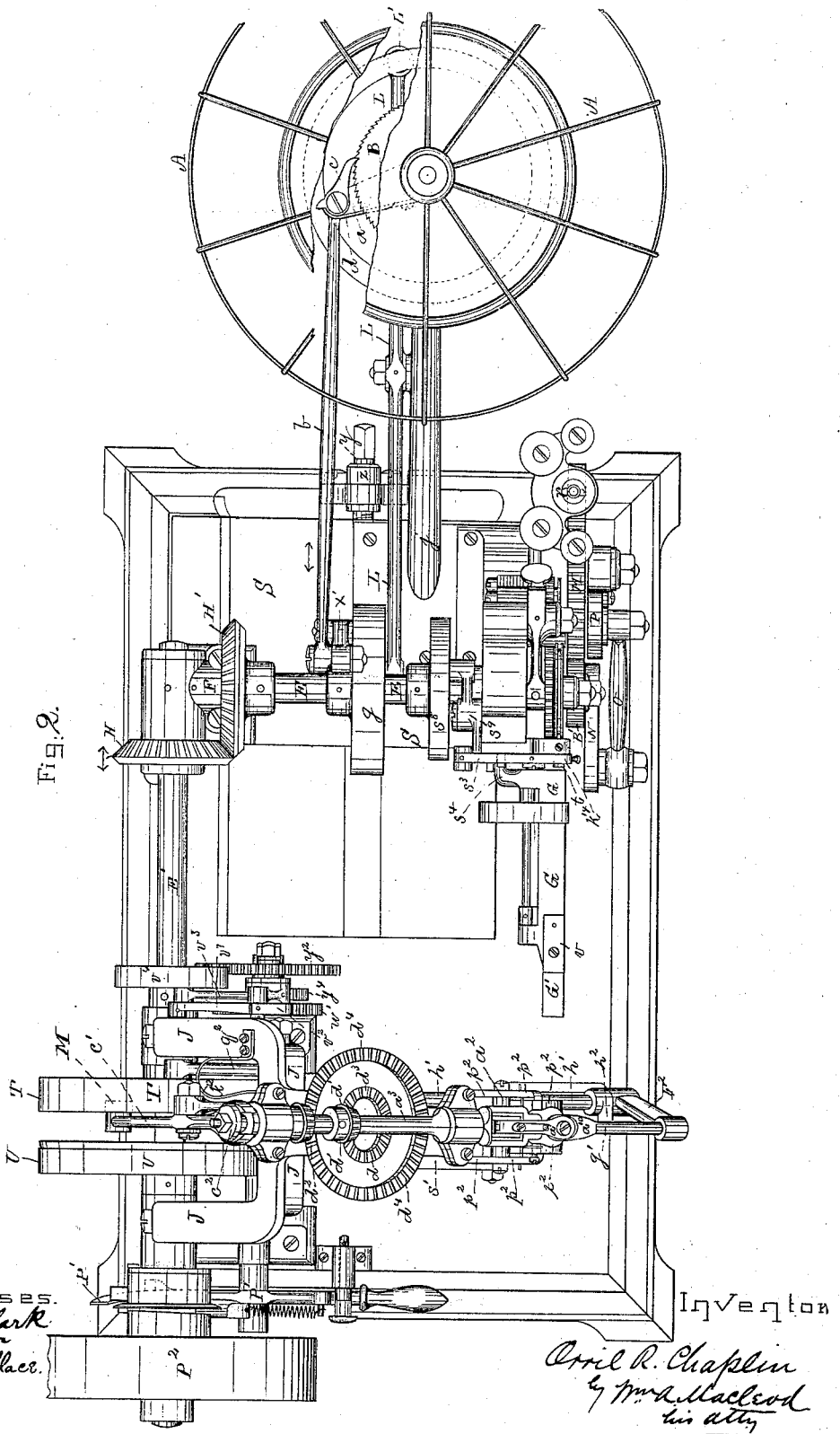
Figure 3:
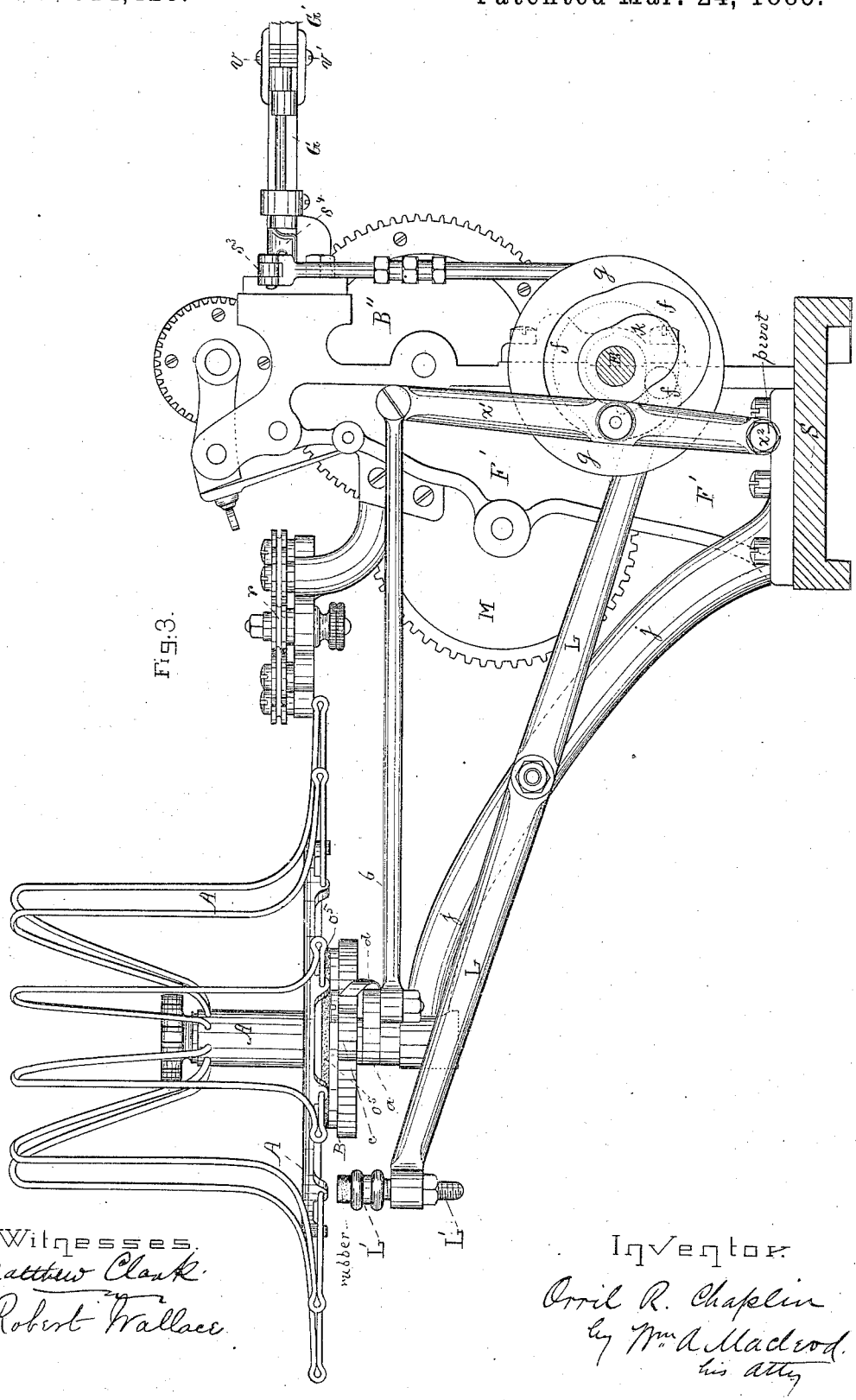

Figure 1 is a front elevation of the machine. Fig. 2 is a plan with reel broken away, to show plan of levers and pawl for actuating the ratchet on which the reel rests. Fig. 3 is an elevation of the reel starting and stopping mechanism, showing rear view of feed mechanism, as also the cutter-lever and conductor. Fig. 4 is an end view from the left of Fig. 2, the driving-pulley and shipper-lever being broken away, and showing the twisting and looping or bending mechanism. Fig. 5 is an end elevation of the mechanism mounted on the slide in the bed-plate, as seen from the left of Fig. 2, the reel being off its spindle and not shown. Fig. 6 is an elevation of the counting mechanism supported on the base of the yoke-shaped frame J, as viewed from the right of Fig. 2. Fig. 7 is a front view, and Fig. 8 is a plan, of the crank and clutch mechanism for operating the feed-rolls. Figs. 9, 10, and 11 are details of the same. Fig. 12 is a cross-section of the bed-plate through the slide S. Fig. 13 is a lengthwise section of the same. Figs. 14 and 15 are a plan and section of cam $v^4$, which actuates the counting mechanism. Figs. 16 and 17 show the cam $s^8$, which operates the cutters. Figs. 18, 19, and 20 show the cams which operate the reel starting and stopping mechanism. Figs. 21, 22, and 23 show the cams which operate the clamps $a'$ and grippers $k^2$. Figs. 24 and 25 are a plan and section of cam U, showing gear-segment attached which drives the twisting mechanism. Fig. 26 is a front view, Fig. 27 a side view, and Fig. 32 a top view, of the sliding head $k'$ and grippers $k^2$. Figs. 28, 29, 30, and 31 are details of the same. Fig. 33 is a top view of the stop-pawl and mechanism which prevents any uncertain movement of the gear $f^3$. Fig. 34 is a side view of the same, showing the gear in section.

My improved machine is built after the same general plan as the machine shown and described in Letters Patent of the United States No. 261,907, granted to me August 1, 1882, and is for the same object, viz: the manufacture from the coil of wire of a complete bottling-wire by successive operations and without the intervention of hand-labor. The operations performed by this machine are the same—viz., the cutting, looping, twisting, and depositing of the wire—as in the machine shown and described in the said above-mentioned Letters Patent; but substantial changes have been made in the mechanism for performing the various operations, as also for controlling the movement of the wire from the reel, so that I am enabled by slight adjustment and without using more than one machine to produce bottling-wires of any desired length, of a greater or less twist, of any desired size of loop, and deposit them in quantities of one hundred, five hundred, one hundred and forty-four, or any other given number to suit the demands or the convenience of the user.

As an aid to a more complete understanding of certain details of the machine previously fully described, reference may be had to the said Letters Patent, No. 261,907.

I will describe the various parts of the machine in the order of its operation in making a bottling-wire, beginning with the reel for holding the wire, and using letters of reference to the accompanying drawings. The reel A, which holds the wire, is set on a spindle in a convenient position to the feeding-rollers. The mechanism shown in Fig. 3 is provided to insure the proper rotation of the reel and consequent giving off of the wire as it is fed forward by the feed-rolls. This leaves the wire free to be fed forward, and prevents any tendency of the wire to slip between the rolls. The mechanism consists of a ratchet-wheel, B, set on the spindle with the reel A, and on which the reel rests, a washer, $o^5$, of leather or other suitable material being interposed between the reel and ratchet to increase the friction. A short lever, $a$, pivoted at one end to the spindle-support and at the other to the connecting-rod $b$, carries a feed-pawl, $c$, so pivoted to it that the taking end of the pawl is in contact with the ratchet-teeth and is held against them by the pressure of spring $d$. The connecting-rod $b$ is pivoted to an upright lever, $x'$, the lever being pivoted at its lower end, $x^2$, on the slide S of the bed-plate, and provided near its middle with a cam-truck, which moves in the cam-path $f$ on the face of cam-wheel $g$, set on shaft E, the cam-path being of the form shown in Fig. 18. It will be plain that at every revolution of the cam-wheel the cam-lever is moved toward the ratchet-wheel, carrying with it the rod $b$, and pushing the feed-pawl $c$ against the ratchet-teeth, thus turning the ratchet-wheel, together with the reel which rests on it, and causing the reel to give off the wire as the feed-rolls feed it into the machine. As the cam-wheel $g$ completes its revolution the rods $a$ and $b$ are moved in the opposite direction, and the feed-pawl slips back over the ratchet-teeth, ready for the next forward movement. The reel A may of course be made fast to the ratchet-wheel, if required, in any case.

L is a lever, pivoted near the middle to the reel-support $j$, and arranged so that its free end may press against the under side of the reel A and stop its momentum when the feed-rolls cease acting, and thus prevent any undue turning of the reel. It is pressed against a smooth ring on the under side of the reel, and freed from contact therewith alternately by the revolution of cam-wheel $g$, the inner end of the lever being provided with a cam-truck, which moves in the cam-path $k$, cut, as shown, on the face of cam-wheel $g$, Fig. 20, and as the inner end is depressed by the cam the outer end will be raised and made to press against the smooth ring or path on the under side of the reel and stop its movement, while when the inner end is raised by the cam the outer end will be freed from contact with the reel, and the reel will be free to be moved by the forward movement of the feed-pawl $c$, moving the ratchet-wheel on which the reel rests. The outer end of lever L, which touches the reel, is provided with an adjusting-screw, L', having a rubber cap for the purpose of producing greater friction when it touches the reel. Between the reel and the feed-rolls I find it best to set a series of small rolls grooved on their peripheries to receive the wire. These rolls are set, as shown, (see Figs. 1 and 3,) and the wire passing between them on its way to the feed-rolls presents a more even resistance to the action of the feed-rolls, feeds more smoothly, and is also straightened and freed from twists and the like. The middle roll, $r$, is set by means of a thumb-screw in a slot which admits of its adjustment, as may be required, for different sizes of wire. The feed-rolls do not differ essentially, as will be apparent, from those shown and described in the said Letters Patent No. 261,907, granted to me. Motion is communicated to them, however, by different mechanism, which consists of a gear-wheel, M, which meshes with the cogged hub B' of the lower feed-roll, B''. The gear-wheel M is driven by a slotted crank, N, set on the end of shaft E. At the outer end of the crank a connecting-rod, O, is pivoted to a slide which moves in the slot $m$, the slide being arranged so that it may be set at any point in the slot, and thus get a longer or shorter action of the crank, as will be apparent. The other end of the connecting-rod O is pivoted to a lever, P, one end of which is set on the end of the stud $p$, on which the wheel M is also set, while the other end of lever P carries the propelling-pawl $q$ and mechanism for setting the pawl against and freeing it from the gear-teeth on the wheel M. The end of the rod O is pivoted to the clutch-operating lever R near its middle and to the lever P, the pivot-hole in the lever P being slightly elongated, as shown, Fig. 9, so as to allow a slight play of the pivot in the hole in order to actuate the clutch-operating lever R sufficiently to force the propelling-pawl $q$ into contact with or free it from the gear-wheel M. The lever R, which operates the clutch, is of the shape shown, and is pivoted at R' to the upper part of the lever P, and near the middle to the connecting-rod O, while at its bearing end it carries a beak, $r''$, which operates in a V-shaped notch, $r'$, in the pawl to tilt the pawl and cause it to take with or be free from the gear-teeth on the wheel M. The pawl $q$, as will be seen, is pivoted to the lower end of lever P.

The operation of this mechanism for driving the wheel M and the feed-rolls is as follows: The lever P and pawl $q$, before beginning to act on wheel M, appear at the right of the wheel as viewed from the front of the machine, Fig. 1, (see also Fig. 7,) and the crank N is on the right of its shaft. The pawl $q$, it will be obvious, will be free from contact with wheel M, since the lever R will be pressed back by reason of the pivot-pin in the end of rod O moving to that side of its slot in lever P, thus causing the beak of lever R to bear against the side of the V-shaped notch in pawl $q$, and raising the beak of the pawl from contact with the gear-teeth. If, now, the crank continues its revolution, it will move downward and toward the left of its shaft, carrying with it the connecting-rod O, the pivot-pin of which will slip to the opposite side of the slot in lever P, carrying with it lever R, the beak of which will now press against the other side of the V-shaped notch in the pawl, thus forcing the beak of the pawl into contact with the gear-teeth on wheel M. As the revolution of the crank continues the wheel M is turned until the crank begins to move toward the right again, when the rod O is pressed back, pressing the pawl $q$, and carrying the pawl mechanism back to repeat the forward movement again as the crank again passes the horizontal and begins its movement to the left. By actuating the feed-pawl $q$ in this manner I obtain a movement of wheel M, which begins slowly, increases in rapidity to the middle of the movement, and ends slowly, which is desirable in this class of machines. I also am enabled to move the pawl back after each forward movement free from contact with the gear-teeth, instead of dragging it back on them, thus preventing wear of the pawl and teeth, and rendering the mechanism noiseless. The wire passes from the feed-rolls through the cutters, one of which is stationary, $k^{13}$, and the other movable, $k^{14}$, made and actuated in the manner shown in the said Letters Patent, No. 261,907, granted to me. I prefer, however, to set the cutting-holes in the cutters through which the wire passes and by which it is cut, in pieces of steel, (shown at $t$, Fig. 2,) so that when the cutting-edges of the holes require sharpening the pieces may be removed and sharp ones inserted in their places. The conductor G, which conducts the wire from the feed-rolls and cutters to the twisting-clamps, is also the same in position and mode of operation as in the former machine, shown in the aforementioned Letters Patent. It is hinged, however, on the opposite side, and is provided with an extension, G', which may be attached to it by screws $v$ $v'$ when a long bottling-wire is being made. The lid of the conductor G is opened by downward action of cutter-lever $s^3$ on arm $s^4$, projecting from the lid. The lever $s^3$ operates the movable cutter $k^{14}$ by means of connecting-rod $s^6$, cam-lever $s^9$, and cam $s^7$ in cam-wheel $s^8$ on shaft E, as will be readily understood.

In order to make bottling-wires of any length on the same machine without loss of wire or subsequent manual operation, I found it necessary to be able to vary the distance between the cutters and the clamps which seize and twist the wire, this distance being that which determines the length of the wires. To do this, I place the parts of the machine which have thus far been referred to, which include the reel and reel-operating mechanism, the feeding and cutting mechanism, and the conductor, on a slide, S, in the bed-plate. (See Figs. 12 and 13.) This slide is of the dovetail form in cross-section shown in Fig. 12, and fits in a corresponding groove or recess in the bed-plate. One side of the recess is fitted with an adjustable side or strip, $s^{10}$, against which the adjusting-screws $w$ bear, which enables it to be set with relation to the slide, as will be readily understood. The set-screw $y$ is fast in a stud-piece, $z$, secured by screw-bolts to the end of the bed-plate, and works in a hole in the slide fitted to receive the screw. By putting a crank on the square head of the set-screw the screw may be turned and the slide moved outward or inward, thus increasing or diminishing the distance between the cutters and the seizing and twisting clamps, and thus enabling the machine to make a longer or shorter bottling-wire, as may be required. The secondary shaft E, which actuates the parts on the slide in the bed-plate, is journaled into two uprights, F and F', which rise from the slide. The upright F also supports one end of the main shaft E', which is set at right angles to the secondary shaft, and is connected with it by the miter-gears H H'. The upright F is free to slide back and forth under the shaft as the slide in the bed-plate on which it rests is moved, and the gears retain their same relative position, the gear H being keyed to the main shaft by grooving the shaft lengthwise and using a feather or key in the well-known manner, which allows the gear to be slipped in a direction lengthwise of the shaft. When the slide of the bed-plate is set back, and the machine arranged to make short lengths of bottling-wires, the end of the main shaft E' will project to the right of the upright F, when the machine is viewed as shown in Fig. 2. The mechanism which seizes and twists the wire is operated directly by the main shaft E', and rests not on the slide but on the stationary part of the bed-plate. This mechanism is supported on a stationary frame, J, of the same general shape as the reciprocating frame shown in the aforementioned Letters Patent granted to me—that is, it is of an inverted Y or yoke shape, as shown. (Figs. 1 and 2.) This frame J is secured to the bed-plate, and supports the main shaft E', which is journaled to it, and which carries inside the yoke-shaped frame the cam-wheels T and U, which operate the seizing, twisting, and bending mechanism. The twisting-clamps $a'$ are mounted in a box, $a^2$, on the end of the hollow spindle $a^3$, journaled in the frame, as shown, and through which the rod $b^2$ projects to operate the toggles which open and close the clamps. The outer end of the rod $b^2$ is held in contact with the cam-lever $c'$ by check-nuts $c^2$ $c^3$. The inner check-nut, $c^3$, is provided with a hub projecting toward and against the outer nut, $c^2$. The end of the cam-lever $c'$ is Y-shaped, the Y embracing the hub on the check-nut $c^3$. The cam-lever $c'$ is pivoted near its middle to a projection of the frame, and carries at its lower end a truck which acts in the cam-path M'. The inward or outward movement of the rod $b^2$ opens or closes the toggled clamps $a'$, as will be readily understood.

In order to twist the wire, the spindle $a^3$ is revolved, carrying with it the clamps $a'$. To effect this, the spindle is provided with the bevel-pinions $d'$ $d^2$, keyed to it in the well-known manner, so that the pinion may be slipped along the spindle and thus brought in contact with or freed from its gear, as desired. The gears $d^3$ $d^4$ are in one wheel, made as shown, Fig. 4, which is set on the upper end of the upright shaft $f'$, which is journaled in the frame J. The lower end of the shaft is fitted with a pinion, $f^3$, which meshes with the gear-segment $f^2$, fast to the periphery of cam-wheel U. The pawl $k^{11}$, pivoted to the frame, is actuated by a spring, $k^{12}$, which acts to throw it against the pinion $f^3$, and by the rider $f^4$ fast to the cam-wheel, which acts to free it from the pinion while the pinion is in contact with the gear-segment. This rider is so arranged that as the segment passes the pinion the rider will have passed the pawl, thus allowing the pawl to be thrown against the pinion and hold it firmly in position. By this means any uncertain movement of the pinion, and consequently of the twisting-clamps, is avoided. The double gears $d^3 d^4$ at the upper end of the upright shaft $f'$ and the two bevel-pinions $d' d^2$ are provided to enable the same machine to produce wires of greater or less twist, as desired. When less twist is desired, the pinion $d'$ is slipped into position to mesh with the gear $d^3$, and the pinion $d^2$ is slipped back and out of contact with gear $d^4$. Twice the number of twists can be obtained by reversing the position and allowing the spindle $a^3$ to be revolved by pinion $d^2$ in contact with gear $d^4$, as will be readily understood. A support, $F^2$, rises from the bed-plate, and stretching between this support and the frame J are placed a guide-rod, $g'$, and a rock-shaft, $h'$. The guide-rod supports the head $k'$, which reciprocates upon the rod, and which forms a support for the grippers $k^2$. The grippers are pivoted to the front of the head and are opened and closed by a toggle-connection with the piece $p'$, which slides on the lower guide-rod, $g^2$. This rod $g^2$ is connected with the rock-shaft $h'$ by the pieces $h^2$, and is raised or lowered to open or shut the grippers $k^2$ by means of the connecting-rod $q'$ and cam-lever $q^2$, the connecting-rod being pivoted at its upper end to the lower guide-rod, $g^2$, and at its lower end to the cam-lever $q^2$, as shown at $q^3$, Fig. 1. The cam-lever is pivoted at $q^4$ inside the frame J, and is provided with a cam-truck which acts in the cam-path $q^5$ in cam-wheel T. This cam-path is shown in Fig. 23.

It will be obvious that at each revolution of the cam-wheel the grippers $k^2$ will be opened and closed, and that by means of the lower guide-rod, $g^2$, set on its rock-shaft $h'$ the cam-lever may act to open or close the grippers $k^2$ irrespective of their position on the guide-rod $g'$—that is, whether the head $k'$, supporting the grippers, be slid forward on the guide-rod $g'$ toward the support $F^2$ or back toward the frame J.

The grippers $k^2$ perform three functions. They guide the wire from the end of the conductor between the open twisting jaws or clamps $a'$. They also move forward toward support $F^2$ when the clamps $a'$ have closed, thus sweeping the ends of the wire together and bending the wire around the jaws of the clamps forming the loop; and, further, as the ends are thus brought together, they close on the wire and hold one part of it stationary, while the twisting-clamps $a'$ are acting to twist the portion between them and the grippers $k^2$.

In order that the grippers $k^2$ may form guides for the wire as it leaves the conductor, the pieces $p^2$ are provided, pivoted centrally to the side of the head $k'$, and formed as shown, Figs. 27, 30, and 31, so that when the grippers $k^2$ are open and drawn back toward the frame J, so that the clamps $a'$ lie between them, the forward ends of the pieces $p^2$ are in contact with the under side of the gripper-jaws and form with them flaring eyes, which receive and guide the wire between the clamps $a'$. The forward ends of the pieces $p^2$ are pressed up against the under side of the gripper-jaws by reason of the rear end of the pieces coming in contact with the pins $p^3$, set in frame J, whenever the head slides back to the frame. When the head moves forward, the rear ends of pieces $p^2$ move from under the pins $p^3$, and the spiral springs $s$, fast at their lower ends to the head $k'$, act to pull down the forward ends of the pieces $p^2$ away from the grippers, thus allowing the ends of the wire as they sweep round by the forward movement of the head and grippers to come together. When the ends of the wire are brought together, the toggle mechanism acts, and the grippers close and hold the wire stationary while the twisting-clamps $a'$ are acting. One jaw of the grippers is faced with a strip of steel, $s^{10}$, adjusted by screw $s^{11}$. This allows the jaw to accommodate itself to wire of different sizes without special adjustment. The opposite jaw is fitted, where it comes in contact with the wire, with a piece of hardened steel, which, when worn, may be easily and speedily replaced. The reciprocating motion of the head $k'$ is obtained by means of the connecting-rod $s'$ and adjustable slotted cam-levers $t' t^2$, and cam $t^3$ in the face of cam-wheel U. (See Fig. 4.) The cam-lever $t'$, which carries the cam-truck, is pivoted to the inside of the frame J, and is slotted at its upper end, so that it may be secured at any point in the slot by the sliding pivot $t^4$ to the slotted lever $t^2$, which is pivoted at its lower end to frame J, and at its upper end to the connecting-rod $s'$.

It will be obvious that to obtain a greater or less throw of the lever, and consequently a greater or less length of slide to the head $k'$, and so allow a greater or less portion of the wire to be twisted, it is only necessary to secure the sliding pivot $t^4$ at a higher or lower point in the slotted levers $t' t^2$, and to obtain a throw of extra length the pivot $t^5$ may be changed and set in the hole $t^6$, thus increasing the length of the lever above the pivot, and consequently largely increasing the length of its throw.

The counting mechanism (see Fig. 6) consists of a ratchet-wheel, $w'$, set on a spindle, $w^2$, projecting from frame J, the feed-pawl $v^2$, retaining-pawl $v^7$, actuating-lever $v^3$, and cam $v^4$, provided with cam-path $s^{15}$, the pinion $y'$, also set on spindle $w^2$, and gear $y^2$, set on spindle $y^3$, on which is also set the rider-wheel $y^4$, on the periphery of which the lower pawl, $w^3$, rides. The ratchet is provided with a hub, projecting outward along the spindle $w^2$, and fitted with grooves into which corresponding flanges on the hub of the pinion $y'$ fit, to insure the revolution of the pinion with the ratchet. On the hub of the ratchet is journaled the elbow cam-lever $v^3$, bearing at one extremity the feed-pawl $v^2$, and at the other a cam-truck which runs in the cam-path $s^{15}$. The retaining-pawl $v^7$ is pivoted, as shown, Fig. 6, on the side of the frame, and prevents any backward movement of the ratchet $w'$. It will be obvious that at each revolution of the cam-wheel the feed-pawl will feed the ratchet forward one tooth, and that as the ratchet and pinion are keyed together the pinion performs a complete revolution whenever the ratchet does. The gear $y^2$ is keyed or locked to the projecting hub of the plain or rider wheel $y^4$ in the same manner as the pinion and ratchet just described are locked together, and the two therefore revolve together on spindle $y^3$. The plain or rider wheel $y^4$ is provided with a notch, $p^4$, on its periphery, into which the end of the pawl $w^3$ is forced as the notch comes over it, the pawl being set fast on the rock-shaft $p^5$, actuated in the well-known manner by spiral spring $s^2$, (see Fig. 1,) fast at one end to the shaft and at the other to the foot of frame J. If, now, the pawl drops into the notch, the rock-shaft is turned by the spiral spring sufficiently to throw the end of the shipper-lever P' in contact with the clutch mechanism, and the driving-pulley $P^2$ is unlocked from the shaft and made a loose pulley, and the machine is stopped.

Any form of clutch mechanism may be used; but I prefer to use the form shown in the drawings, and which is more fully shown and described in an application for Letters Patent filed by me the 23d day of September, A. D. 1882. It will be plain, therefore, that as a complete bottling-wire is made at each revolution of the main shaft, if the gear $y^2$ be provided with five times as many teeth as the pinion $y'$, and the ratchet-wheel be provided with one hundred teeth, the gear will complete a revolution to each five hundred revolutions of the main shaft, and that at each revolution of the gear the plain or rider wheel will complete a revolution and its notch $p^4$ will come under the pawl $w^3$ and stop the machine, thus stopping the machine whenever five hundred wires have been made. It will be obvious, also, that several sets of gears and pinions may be made with each machine, the teeth of which may be proportioned to each other, so as to produce a complete revolution of the gear, and consequently of the rider-wheel, when a greater or less number of revolutions of the shaft have been made, and by substituting these on the machine for the gear $y^2$ and pinion $y'$ the machine may be stopped when any given number of wires have been made.

The operation of the machine is as follows: The reel is started by the movement of the ratchet on which it rests simultaneously with the movement of the feeding mechanism to feed forward the wire, so that the work of moving the reel is not done by the feed-rolls. When the reel is revolved by the feed-rolls in drawing the wire from it, the wire is apt to bind on it and will not give off freely, unless the reel be specially filled from the coils of wire, which necessitates labor and expense. By this mechanism, however, I am enabled to use the wire from the coils and without reeling it. The wire passes through guide $x^{10}$, under the eccentric pressure-pin $x^{12}$, between the feed-rolls, and through the cutting-holes into the conductor. The pressure-pin $x^{12}$ is set tightly in the frame, but so that it may be turned and set in any position, the friction of the pin in its hole holding it securely. The pin is sufficiently long to project over the wire, and is provided at its outer end with an eccentric head, so that by turning the pin a greater or less degree of pressure of the head against the wire may be obtained. It is found in working some kinds of wire that the wire has a tendency to curl slightly after leaving the conductor, and thus is liable to miss the eye $x^{11}$ of the grippers. A slight pressure obtained by the eccentric head of the pin $x^{12}$ prevents this tendency to curl, and causes the wire to pass straight through the eyes of the grippers. From the conductor it passes through the eyes $x^{11}$, formed by the grippers $k^2$ and pieces $p^2$, passing between the open jaws of the twisting-clamps $a'$, and is run through so that it projects as far on the other side of the twisting-clamps $a'$ as the distance from the clamps to the cutters. This is to make a bottling-wire having legs of equal length. If one leg is to be shorter than the other, then it will be plain that the feed-rolls must be set to feed a less length of wire forward. When the wire has been fed forward sufficiently, the reel and feed mechanism stop, the clamps $a'$ close, and the cutter tilts to cut the wire and open the lid of conductor G. The head and grippers now slide forward, bending the wire around the jaw-pieces $a^{10}$ of clamps $a'$. (The size of the loop depends upon the size of these jaw-pieces, several pairs of which are furnished, which may be used for different sizes, as desired.) When the head has slid forward a sufficient distance in front of the jaws, the grippers close and hold the wire stationary, the clamps now revolve with spindle $a^3$ and twist the wire, then open, and the wire drops out. A slide or receiver may be placed, as indicated, Fig. 4, underneath the clamps, to receive the wire as it leaves them and carry it clear of the machine.

In driving the machine at a high rate of speed I find it convenient to use the attachment shown at the right of Fig. 4 for tilting the slide I, on which the completed wires drop in order to free them instantly from the twisting-jaws, and thus keep the machine clear. If the slide I be kept stationary, the completed wire may not leave the twisting-clamps $a'$ rapidly enough to be clear before the succeeding wire is seized. In order to insure this, I provide the attachment shown at the right of Fig. 4 to tilt the slide. It consists of an elbow-lever, I', pivoted at the elbow to the upright $F^2$, and having the slide I secured to its upper end. The arm $I^2$, soldered on the under side of the slide, fits in a hole in the top of the lever and is secured there by a set-screw. The other end of the lever is pivoted to a connecting-rod, $I^3$, the upper end of the rod being set on the lower guide-rod, $g^2$. As the guide-rod is raised and lowered in closing and opening the toggled grippers $k^2$, the elbow I' is tilted, thus tilting the slide and discharging the wire which has fallen upon it by the same movement that closes the grippers $k^2$ on the succeeding wire and keeping the machine clear.

I also find it convenient in using some kinds of wire to give the reel a continuous movement, so that it will give off the wire ready for the feed-rolls by a continuous rather than an intermittent motion. This may be easily effected by removing the reel actuating and stopping mechanism shown in the drawings and previously described, and substituting therefor an extension-shaft secured directly to the end of the main shaft E. This extension is provided with a universal joint of common construction, (which enables it to be carried at an angle over to the reel-spindle,) and at its end carries a bevel-gear, which meshes with another bevel-gear set on the reel-spindle in place of the ratchet-wheel shown in the drawings. This extension-shaft may be supported by a stud rising from the bed-plate or projecting from the arm $j$, which supports the reel. The reel in this case will then rest upon the bevel-gear instead of upon the ratchet, and will revolve as the gear revolves with the revolution of the main shaft.

I claim—

1. In a wire-working machine, the reel A with means for giving it a positive intermitting rotary movement, in combination with shaft E and the feed-rolls, and mechanism whereby the said rolls are operated, substantially as shown and described.

2. The reel A, in combination with ratchet B, pawl $c$, spring $d$, lever $a$, connecting-rod $b$, lever $x'$ and its actuating-cam, and shaft E, substantially as shown and described.

3. The reel A, in combination with stop-lever L, provided with adjusting-screw L', cam $k$, and shaft E, substantially as shown.

4. The combination of reel A, the ratchet, lever $a$, pawl, connecting-rod, cam-lever $x'$, and its cam $f$, with the stop-lever L and its cam, as set forth.

5. In a wire-working machine, the combination of the feed-rolls, the presser-pin $x^{12}$, and the guide-pin $x^{10}$, whereby the direction of the end of the wire after passing between the rolls may be governed, all as described.

6. In a wire-working machine, a bed-plate containing a slide supporting the reel, and the mechanism for straightening, feeding, cutting, and conducting the wire, and arranged to admit of increasing or diminishing the distance between the cutters and the twisting mechanism, for the purposes described.

7. The combination of the toggled twisting-clamps $a'$, spindle $a^3$, pinions $d'\ d^2$, compound gears $d^3\ d^4$, and shaft $f'$ and its actuating-gear and segment, substantially as described.

8. The combination of the twisting-clamps $a'$, supported by the stationary frame J, and the sliding head $k'$, bearing the holding-grippers, all as shown and described.

9. The grippers $k^2$ and head $k'$, set on guide-rod $g'$, in combination with connection $s'$, slotted adjustable cam-levers $t'\ t^2$, and cam $t^3$, substantially as shown.

10. The grippers $k^2$, mounted and operated, as shown, in combination with the pieces $p^2$, pin $p^3$, and spring $s$, substantially as shown and described.

11. The head $k'$ and toggle-grippers $k^2$, in combination with connecting-piece $p'$, lower guide-rod, $g^2$, rock-shaft $h'$, connection $q'$, cam-lever $q^2$, and cam $q^5$, substantially as set forth.

12. The grippers $k^2$, provided on one jaw with the adjustable spring-face $s^{10}$ to adapt the grippers to wire of varying sizes, as shown.

13. The grippers $k^2$ and their operating mechanism whereby the wire is seized, bent, and twisted, in combination with gear $y^2$, actuated as shown, rider-wheel $y^4$, pawl $w^3$, rock-shaft $p^5$, spring $s^2$, and shipper P', substantially as described.

14. The combination of cam $s^{15}$, elbow-lever, ratchet, feed, and retaining pawls, pinion $y'$, gear $y^2$, rider-wheel $y^4$, drop-pawl, rock-shaft, spring, and shipper, for the purposes and substantially as described.

15. The slide I, in combination with the elbow-lever I', connecting-rod $I^3$, and lower guide-rod, $g^2$, for the purposes specified, and substantially as described.

ORRIL R. CHAPLIN.

Witnesses:
WM. A. MACLEOD,
ROBERT WALLACE.